United States Patent [19]
Chen et al.

[11] Patent Number: 6,100,510
[45] Date of Patent: Aug. 8, 2000

[54] HEATING UNIT INCORPORATING A TEMPERATURE SENSOR

[75] Inventors: Stephen T. Chen, Winchester, Mass.; Bruce E. Metz, 4802 Ferris Dr., Wilmington, Del. 19808

[73] Assignee: Bruce E. Metz, Wilmington, Del.

[21] Appl. No.: 09/176,919

[22] Filed: Oct. 21, 1998

[51] Int. Cl.[7] ................................................. H05B 1/02
[52] U.S. Cl. ..................... 219/497; 219/499; 219/501; 219/481; 323/236; 374/1
[58] Field of Search .................................. 219/494, 481, 219/497, 499, 501, 505, 507; 323/236, 235, 319; 307/117; 374/1

[56] References Cited

U.S. PATENT DOCUMENTS

| | | |
|---|---|---|
| 3,679,871 | 7/1972 | Evalds . |
| 3,789,190 | 1/1974 | Orosy et al. ............................. 219/497 |
| 3,939,687 | 2/1976 | Waldron ................................ 219/499 |
| 3,946,200 | 3/1976 | Juodikis ................................ 219/497 |
| 3,959,692 | 5/1976 | Wetzel .................................. 219/497 |
| 4,086,466 | 4/1978 | Scharlack .............................. 219/499 |
| 4,845,342 | 7/1989 | Chen .................................... 219/501 |

*Primary Examiner*—Mark Paschall
*Attorney, Agent, or Firm*—William H. Eilberg

[57] ABSTRACT

A control device includes both a heating element and a temperature sensor. The control device has the form of a Wheatstone bridge which applies sensing current to the heating element. When the bridge is unbalanced, the control device may apply heating current to the heating element. In one embodiment, the sensing current is switched, so that it flows only for a relatively small part of the electrical cycle. The circuit also includes a provision for reduction or elimination of electrical spikes. The circuit further includes a calibration arrangement, which enables the user to adjust the bridge without passing heating current through the heating element. Another feature of the invention enables the set point of the bridge to be remotely controlled, by adjusting a level of analog current applied to the bridge. The circuit also includes an arrangement for compensating for temperature-induced changes in its components. It also enables the heating element to be located relatively far from its control circuitry, without suffering from undue losses or inaccuracy.

25 Claims, 8 Drawing Sheets

SCR2 SPIKE SUPRESSION CIRCUIT
FIG.5a

LED OUTPUT INDICATOR
FIG.5b

ON BOARD CALIBRATION CIRCUIT
FIG.6

4-20 mA SIGNAL PORT
FIG. 7a

TEMPERATURE COMPENSATION CIRCUIT
FIG. 7b

FIG.8

HEATING UNIT INCORPORATING A TEMPERATURE SENSOR

BACKGROUND OF THE INVENTION

This invention relates to the field of heating units, especially heating units intended for use in processes requiring precisely-controlled amounts of heat.

One conventional method of producing a measured amount of heat is to activate or deactivate a heater according to the output of an independent temperature sensor. The temperature sensor could be a liquid or gas bulb, a thermocouple, a thermistor, an RTD sensor, or other equivalent device. The major disadvantage of this method is that there is an inherent delay between the initial sensing of temperature, and the response by the control device which activates or deactivates the heater. In addition to the problem of delay, a control device using a separate temperature sensor usually causes the heater to overshoot or undershoot its target temperature.

In theory, by combining the heat source and the temperature sensor into a single unit, one can eliminate sensor lag, and can therefore construct electric heating systems which have extremely fast response times, and which are also highly accurate. Such properties are especially important in the construction of high-performance process heating systems, because the thermal mass, and therefore the physical size, of the heating system can then be substantially reduced, and the energy efficiency of the system can be improved. Also, a unit comprising a combination of a heat source and temperature sensor can be tailored to match precisely the needs of the process under all operating conditions.

U.S. Pat. No. 3,679,871 discloses an example of a unit comprising both a heat source and a temperature sensor. This patent, the disclosure of which is incorporated by reference herein, shows a circuit which includes a Wheatstone bridge. One arm of the bridge is a resistive heating element having a positive temperature coefficient. When heat is conducted away from the vicinity of the heating element, the heating element cools, and its electrical resistance decreases, thereby unbalancing the bridge. Through appropriate electronic circuitry, the condition of unbalance causes a relatively large heating current to flow through the heating element, causing the latter to generate more heat, until the resistance of the heating element again reaches the point where the bridge is in balance. Thus, the temperature sensor is the same as the heating element: the circuit does not directly measure temperature, but rather "sees" only the electrical resistance of the heating element.

The above-described circuit is functional, and represents a great improvement over systems using separate temperature sensors and heating elements. But the circuit still has substantial disadvantages. The circuit lacks sensitivity, is limited in range, and exhibits large amounts of "drift". It also generates substantial electrical noise, and produces unacceptably high thermal emissions as well. These deficiencies have substantially impeded the commercial potential of the circuit.

The present invention provides an improvement over the combined heating element and temperature sensor described above. The invention provides an economical but highly accurate and sensitive control device for maintaining a desired amount of heat in an industrial or other process.

SUMMARY OF THE INVENTION

The present invention provides various improvements to a prior art control device which comprises a combined temperature sensor and heating unit. The control device, which is intended to supply a measured amount of heat for use in an industrial process or the like, has the configuration of a Wheatstone bridge, wherein one arm of the bridge is the heating element. When the heating element cools, due to heat exchange with the process requiring heat, the bridge becomes electrically unbalanced, and the condition of imbalance triggers a heating current which is passed through the heating element to restore its temperature.

In one embodiment, the present invention comprises a switching circuit which reduces the duty cycle of the sensing current in the bridge circuit. An electronic switch allows sensing current to flow during only a portion of each positive half-cycle. Reducing the period during which sensing current flows reduces or eliminates excessive heating of both the heating element and the control circuit components, caused by passage of sensing current, without compromising the accuracy of the control device. In the preferred embodiment, the duty cycle of the sensing current is determined by the time constant of an RC combination which controls the electronic switch. The switching circuit has no effect on the passage of heating current through the heating element.

Another improvement provided by the present invention comprises an adjustable circuit for suppression of electrical spikes. The circuit of the present invention uses a pair of silicon-controlled rectifiers (SCRs) to detect the condition of balance of the bridge, and to trigger a thyristor which provides a path for heating current to flow to the heating element. One of the SCRs is triggered by a capacitor, which has the tendency to become charged during the negative-going portion of the electrical cycle, and to cause unintended current to flow through the heating element during the negative portion of the cycle. The present invention provides a circuit which changes the effective time constant of the circuit, according to whether the current is positive or negative. The circuit includes a variable resistor and diode connected in parallel with another resistor which is in series with the capacitor. The diode prevents current flow to the capacitor during the negative portion of the cycle. In effect, the time constant of the RC combination is different during the positive and negative portions of the cycle. This circuit therefore allows the capacitor to perform its function in controlling the proper triggering of SCRs, while preventing the capacitor from triggering an SCR at an inappropriate time and causing unwanted electrical spikes.

Another improvement provided by the present invention relates to calibration. The present invention provides a circuit which allows an operator to calibrate the bridge without ever passing heating current through the heating element. By adjusting the resistance of an arm of the bridge, and viewing a visual indicator such as an LED, one can find the point at which the bridge becomes balanced. At this point, the control device is properly calibrated. The calibration circuit is especially useful when the heating element is replaced.

Still another improvement provided by the present invention relates to remote control of the bridge circuit. The present invention includes a circuit which enables a small input current to vary the effective resistance of one arm of the bridge. The input current is used to control the output current of a transistor, operated in its linear range, and that output current appears across a portion of a resistor in one arm of the bridge. The result is that the effective resistance of that arm of the bridge is changed in proportion to the level of control current. Since the control current may be delivered by a wire which extends over a relatively long distance, this circuit enables the operator to control remotely the set point of the bridge. In the preferred embodiment, the remote control circuit incorporates an opticoupler which electrically isolates the signal source from the bridge circuit of the control device.

Another embodiment of the present invention involves compensation for temperature variations in the SCRs. The sensitivity of an SCR varies with temperature. To compensate for this effect, the present invention provides a thermistor, connected in parallel with a resistor in one arm of the bridge, the thermistor also being in intimate physical contact with an SCR. Thus, a change in SCR temperature causes a change in the effective resistance of an arm of the bridge. Diode locations have been optimized to minimize errors accruing from unnecessary heat dissipation. The present invention therefore compensates for temperature-induced changes by automatically changing the set point of the bridge.

Another embodiment of the present invention solves the problem created when the heating element is located relatively far from the control circuitry. If the same wire is used to detect the voltage drop across the heating element, for purposes of sensing bridge balance, and also to conduct the heating current to the heating element, that wire must be thick enough to accommodate the heating current. But a long, thick wire will exhibit a substantial voltage drop, due to current flow during the sensing period, causing an error in the measurement of bridge balance. The present invention solves the problem by providing a separate set of small-diameter wires, which wires are used exclusively for sensing the voltage drop across the heating element, while the heating current is still carried by larger-diameter wires. The separate small-diameter wires do not exhibit a voltage drop because they do not carry appreciable current.

The present invention therefore has the primary object of providing improvements to control devices which combine a temperature sensor and a heating element.

The invention has the further object of providing a control device for a combined temperature sensor and heating element, wherein the duty cycle of the sensing current is reduced.

The invention has the further object of providing a control device as described above, which device is substantially free of unwanted electrical spikes.

The invention has the further object of providing a control device as described above, wherein the device can be calibrated without passing heating current through the heating element.

The invention has the further object of providing a control device as described above, wherein the device may be adjusted remotely, according to the level of an analog current signal.

The invention has the further object of providing a control device as described above, wherein the device includes means for compensating for the effects of temperature changes on its components.

The invention has the further object of providing a control device as described above, wherein the device includes means for reducing sensing errors experienced when the heating element is located far away from the control circuitry.

The invention has the further object of increasing the accuracy, sensitivity, and stability of controls for combined heating elements and temperature sensors.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
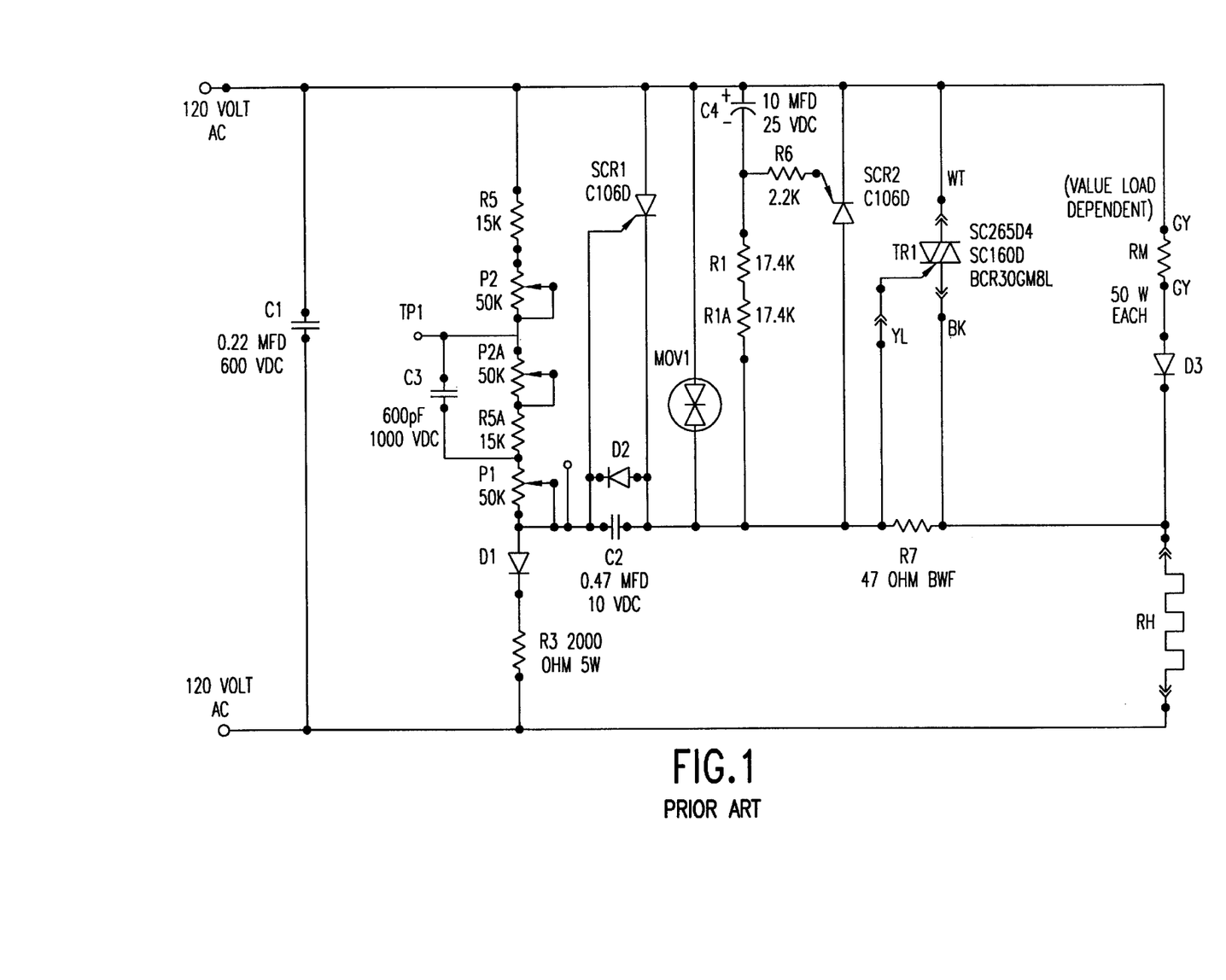
FIG. 1 provides a schematic diagram of a combined heat source and temperature sensor of the prior art.

The present invention comprises an improvement of the prior art circuit shown in FIG. 1. The circuit of FIG. 1 is generally similar, though not identical, to that shown in U.S. Pat. No. 3,679,871, cited above. To understand the operation of the present invention, one must first understand the operation of the prior art circuit of FIG. 1.

The circuit of FIG. 1 is essentially a Wheatstone bridge. The high resistance arm of the bridge comprises the combination of R5, P2, P2A, R5A, and P1. The low resistance arm of the bridge comprises RH, which is the heating element. The intermediate resistance arms of the bridge are R3 and RM. The line containing C2 and R7 is the circuit element which, in a classical Wheatstone bridge, contains a galvanometer. When the voltage across R7 and C2 is zero, the bridge is in balance.

Instead of a galvanometer, the circuit of FIG. 1 uses a pair of silicon-controlled rectifiers (SCRs) to make electronic "decisions" based on the balanced or unbalanced condition of the bridge. The SCRs can be triggered only when the resistance of RH is below the balance point. If the resistance of RH is greater than the balance point, the polarities of the voltages applied to the SCRs are such that the SCRs do not activate.

When the resistance of RH falls below the balance point (presumably due to heat being transferred from RH to the process which is consuming heat), a voltage appears across C2 and R7, and this voltage has the proper polarity to activate SCR1, during the positive half-cycle. The output of SCR1 is connected to the gate of triac TR1, thereby activating TR1, and effectively connecting heating element RH directly to the main power supply, and causing a relatively large heating current to flow through RH. During the negative half-cycle, SCR2 is activated, due to the charge built up on capacitor C4, and the output of SCR2 also activates triac TR1, again allowing a heating current to flow through RH, during the negative half-cycle. Thus, when the resistance of RH is less than its desired value, the circuit applies a substantially continuous current, through triac TR1, to RH, thereby causing RH to generate more heat. As the heating element becomes hotter, its resistance increases, until the bridge becomes balanced, at which time the SCRs are no longer activated, and the triac turns off.

As noted above, the SCRs will not activate if RH rises above the balanced point, i.e. if the heating element becomes hotter than the desired value. But the heating element will inherently correct for the "overshoot" by dissipating the excess heat.

Metal oxide varistor MOV1 is included in the circuit for the purpose of protecting the circuit from electrical "spikes" in the AC supply.

In the circuit of FIG. 1, and in the various embodiments of the present invention to be described below, it is important to distinguish between "sensing current" and "heating current". The term "sensing current" means the current produced by the Wheatstone bridge, used to sense the condition of balance or unbalance, and thereby to determine whether the heating element needs power. The term "heating current" is used to refer to the current supplied through the triac, representing the full current available from the power supply, for the purpose of enabling the heating element to generate more heat. Note that resistor RM limits the amount of sensing current that can flow through RH, and that diode D3 limits the sensing current to half-waves. No such restrictions apply to the power-applying portion of the circuit, i.e. the path including the triac.

From the above description, it is apparent that when the unit is first turned on, the circuit of FIG. 1 will immediately apply full power to the heating element RH, causing its temperature to rise towards the balance point. Clearly, maintaining RH at a particular level of resistance is equivalent to maintaining a specific temperature. The circuit continuously monitors the state of the bridge, during each electrical cycle. The circuit typically operates with alternating current having a frequency of 50–60 Hz. Note that the circuit is entirely analog. An analog system is preferred because the time that would be required to convert from analog to digital form, and from digital to analog form, would compromise system response, and would increase the complexity and cost of the unit.

A major problem with the circuit of FIG. 1 arises from the fact that the sensing current flows through the heating element RH for a full half-cycle. Any current will cause some generation of heat by the heating element. To some extent, such current cannot be avoided, because there is a certain minimum sensing current required to produce a voltage drop across the heating element, and that voltage drop must be large enough to detect. Excess heat produced by the heating element may not be a problem where the heating element has relatively high resistance and where it dissipates heat rapidly and passes only a low-level sensing current. But in circumstances where the heating element dissipates heat more slowly, and/or has a low electrical resistance, heating caused by the sensing current can become a significant problem. The latter situation arises quite often in the construction of electric heating systems having low thermal inertia.

One example of a system that exhibits problems associated with high sensing currents is one in which a short, heavy wire is the heating element. The very low resistance of the wire requires that high sensing currents be impressed, so that acceptable sensing signals are generated. But adequate sensing current for this application also causes the heating element to become quite hot. Indeed, the heating element may become so hot that it may not be possible to maintain its temperature low enough for satisfactory operation of the process being controlled.

Because the prior art circuit of FIG. 1 passes sensing current for a full half-cycle, its long conduction period causes high thermal dissipation, both from control circuit components and from the heating element itself. Ironically, it has been found that the actual sensing operation is essentially completed during only a small portion of the ac waveform; most of the sensing current applied to the heating element is really unnecessary for sensing.

The improvements provided by the present invention are shown in FIGS. 2–8. These figures show preferred embodiments, and the diagrams include component values which have been found to work well in the preferred embodiments. However, the invention should not be considered limited by the specific values set forth, it being understood that many other variations are possible.

Figure 3:
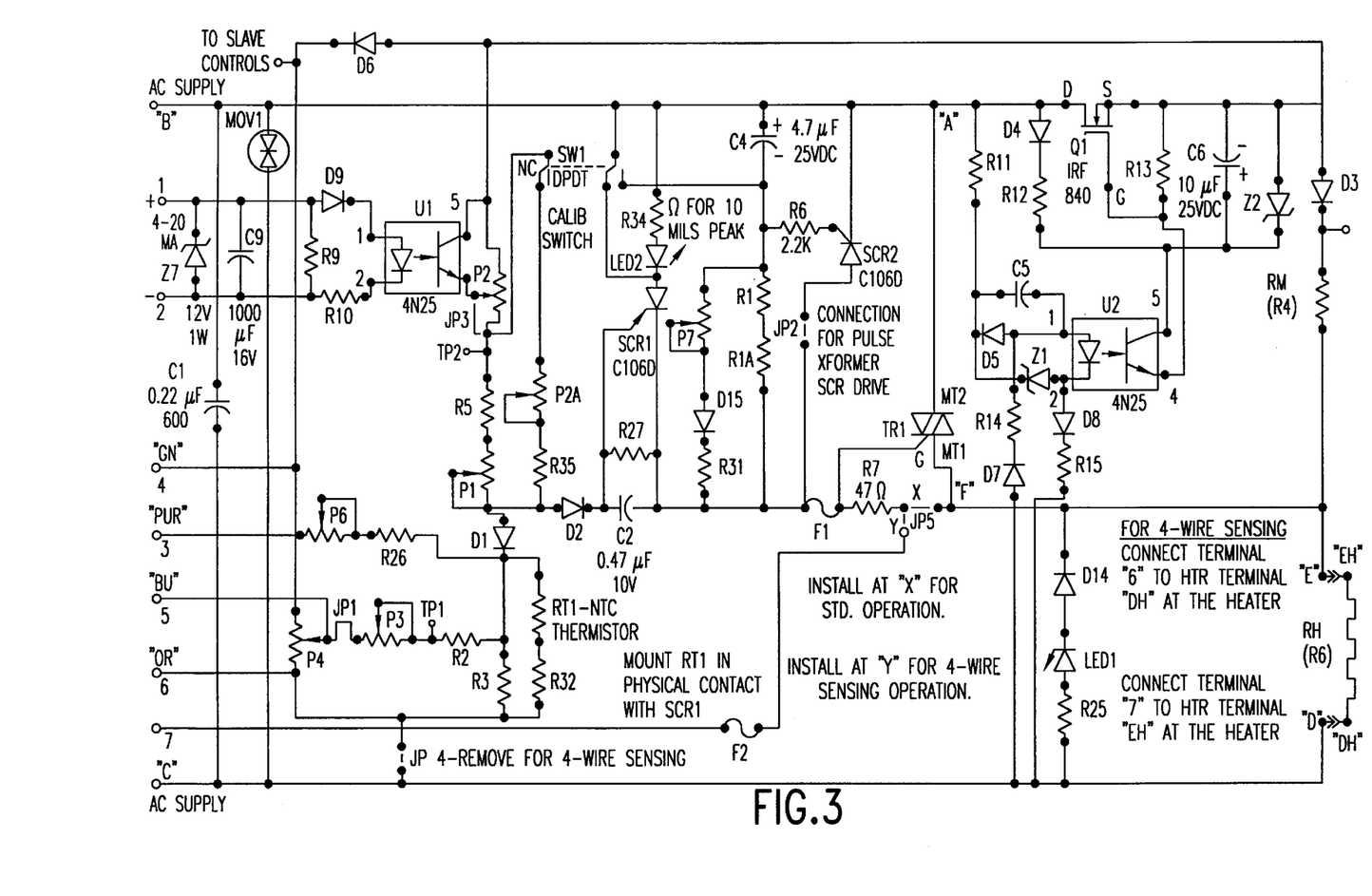
FIG. 3 provides a schematic diagram of an improved embodiment of the heating unit and temperature sensor of the present invention.
Figure 4:
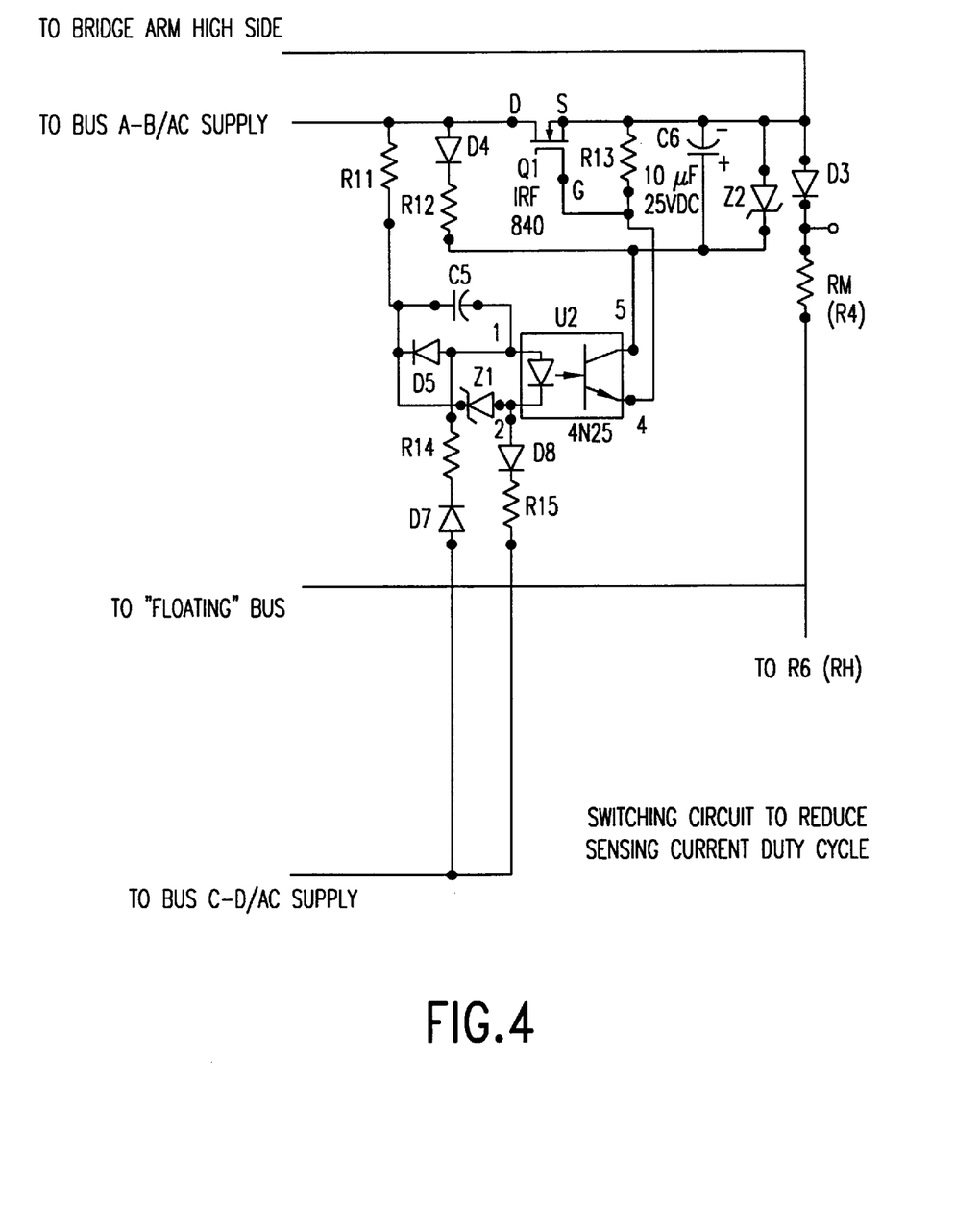
FIG. 4 provides a schematic diagram of a portion of the embodiments of both FIGS. 2 and 3, showing the circuitry for reducing the duty cycle of the sensing current.

The solution to the problem of excessive heat caused by sensing current is provided by the circuit shown in FIG. 4. (FIGS. 4–8 provide illustrations of various portions of the circuit, for purposes of clarity of illustration. Each of the arrangements of FIGS. 4–8 is incorporated into the complete circuits represented by FIGS. 2 or 3, or both.)

The purpose of the circuit of FIG. 4 is to reduce the time during which sensing current flows through the heating element. In particular, in one preferred embodiment, this circuit permits the flow of sensing current only for about 2.0–2.5 ms of each cycle. For alternating current having a frequency of 60 Hz, the length of a cycle is about 16.6 ms, so the circuit shown may reduce the duty cycle of the sensing current by almost an order of magnitude.

The circuit of FIG. 4 comprises two switches, including Q1, shown as an FET, and U2, which is preferably an opticoupler. The combination of diode D4, resistor R12, zener diode Z2, and capacitor C6 effectively comprises a "floating" power supply for switch Q1. The term "floating" is used because the circuit maintains a constant voltage across the source and drain of Q1, though it is not directly referenced to the main power supply of the system. Switch U2 is effectively connected in series with the floating power supply. Turning switch U2 on and off therefore turns switch Q1 on and off.

At the start of a positive half-cycle, capacitor C5 charges, and current flows through the diode of U2. The light produced by the diode turns U2 on, which causes Q1 to turn on. When C5 becomes fully charged, no more current flows through the diode of U2, and U2 turns off. Therefore, Q1 also turns off. Thus, the time constant of the series combination of R11 and C5 determines the period of time during which U2 remains on. Diode D7 and R14 together provide a discharge path for C5 during the negative half-cycle. Thus, C5 will begin the next full cycle in a discharged state. The result is that the sensing current is repeatedly turned on and off. In the preferred embodiment, the component values are chosen such that Q1 turns on at or near the beginning of the positive half-cycle, almost immediately after the zero-crossing, and stays on for about 30° into that half-cycle. The detection process is essentially complete before the sensing current ends, about 30° into the positive half-cycle, or sooner. The sensing period may be longer than 30° to accommodate special circumstances, such as where the circuit operates with very low voltages.

Diode D8 protects the diode of U2 from current flowing during the negative half-cycle. Diode D5 prevents C5 from charging in the reverse direction; D5 can be considered a clamping diode. These components provide further assurance that C5 will be fully discharged at the start of the next positive half-cycle.

Zener diode Z1 assures that the time during which U2 conducts is independent of fluctuations in the line voltage.

The circuit of FIG. 4 therefore comprises a high-speed switching circuit which repeatedly turns the sensing current on and off. Because Q1 is turned on at the beginning of the positive half-cycle, and remains on for a small portion of that half-cycle, sensing current will flow for less than the full half-cycle. This circuit therefore reduces the power dissipation in all components that are exposed to the sensing current.

The choice of values of the various components, which will be apparent to those skilled in the art, determines the time during which the sensing current is applied. In the example given above, wherein the sensing current is turned on for about 2 ms of the waveform, power dissipation can be reduced by a factor of about 8–10.

The circuit of FIG. 4 has been found to reduce electrical noise substantially. It is also much more sensitive than comparable circuits of the prior art. That is, the bridge circuit is able to detect very tiny changes in the resistance of heating element RH, even where the temperature coefficient is very small.

Figure 5A:
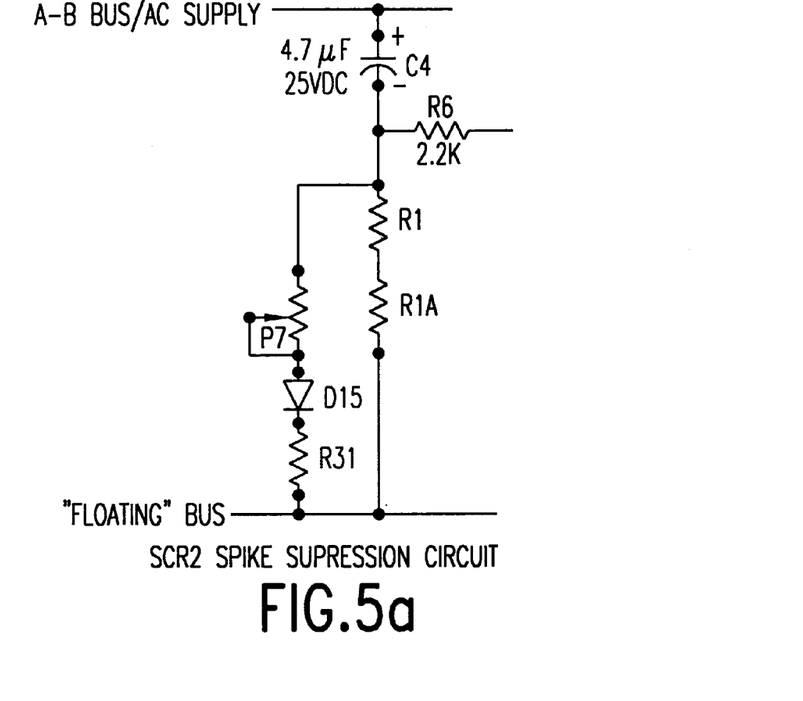
FIG. 5a provides a schematic diagram of a spike suppression circuit used in the embodiments of FIGS. 2 and 3.
Figure 5B:
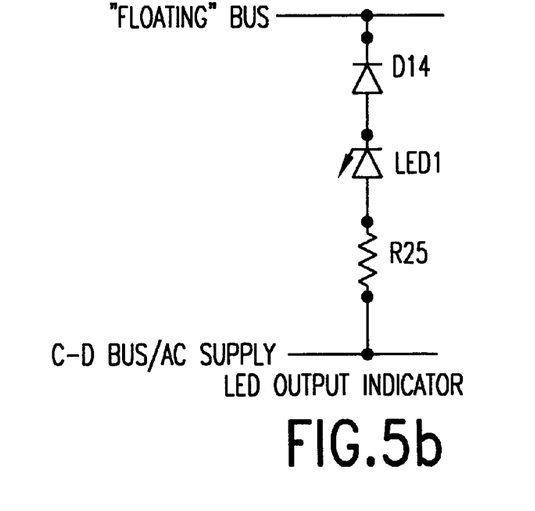
FIG. 5b provides a schematic diagram of a visual output indicator used in both of the embodiments of FIGS. 2 and 3.

FIGS. 5a and 5b show further improvements provided by the present invention. These improvements are also incorporated into the circuits of FIGS. 2 and 3.

FIG. 5a comprises a spike suppression circuit which eliminates the spike resulting from the inherent operation of the circuit of FIG. 1, as will be described below.

SCR1 detects an unbalanced condition of the bridge, and activates the triac TR1 during the positive half-cycle. For the negative half-cycle, one needs SCR2 to activate the triac. The purpose of capacitor C4, therefore, is to carry over the triggering signal from SCR1 to SCR2. When SCR1 does not activate, C4 will be charged positively through R1 and R1A, and R7 and RH, and the upper terminal of C4 will be positive. This places a negative bias on SCR2, which therefore also does not activate. During the negative half-cycle, the same thing happens in reverse; the lower terminal of C4 will be positive. If SCR1 activates, it creates an effective short circuit across C4 and discharges C4 before the beginning of the negative half-cycle. On the negative half-cycle, the activation of SCR2 similarly discharges C4.

The problem arises when SCR1 does not activate and SCR2 should not activate. Since C4 is still connected to the power supply, it will charge, at a rate determined by the time constant of the RC combination of R1, R1A, and C4. Near the end of the negative half-cycle, the voltage across C4 may become great enough to trigger SCR2, which will trigger the triac, and cause unintended power to flow through RH. This is the electrical "spike" discussed above.

It might appear that the solution to the problem would be to increase the resistance of R1 or R1A, to increase the time constant, so that, during the negative half-cycle, C4 does not reach the voltage needed to trigger SCR2. But solving one problem in this manner creates another, because one needs C4 to charge quickly during the positive half-cycle. If the time constant is too large, when SCR1 activates, C4 will not reach the voltage level needed to trigger SCR2 at the desired time, and the result is that power will be applied to the heating element RH for less than the required period.

The solution provided by the present invention is a circuit which effectively exhibits different time constants during the positive and negative half-cycles. The circuit of FIG. 5a has a shorter time constant during the positive half-cycle, because current can flow not only through R1 and R1A, but also through the branch comprising P7, D15, and R31, and the resistance of the parallel combination is less than the resistance of either branch. But during the negative half-cycle, current cannot flow through the branch comprising P7 and R31, due to the blocking action of diode D15. Thus, the resistance encountered by the current is greater, since it must flow only through R1 and R1A, and the time constant is greater. Thus, the circuit of FIG. 5a provides a longer time constant during the negative half-cycle, thus preventing C4 from triggering SCR2 unintentionally.

By varying P7, one can "tune" the response of the spike suppression circuit. Varying P7 will vary the difference in time constants seen by the positive-going and negative-going currents.

The spike suppression circuit has been found not only to reduce the unwanted spike, but it also reduces electrical noise in the circuit, and further reduces unwanted element heating. It also contributes to the overall stability of the circuit.

FIG. 5b shows an LED output indicator which is connected across the heating element in the present invention. The LED provides a visual indication that a pulse of heating current is being applied to heating element RH. Due to the polarity of the LED, and also due to the action of blocking diode D14, sensing current cannot flow through the LED. Thus, the LED can be activated only when sensing is not being done, i.e. during the negative half-cycle. If the temperature of the heating element is very close to the value at which the bridge is in balance, only occasional pulses of heating current may be applied to the heating element, and the LED may flash sporadically. When a heat load is applied to the heating element, and its temperature falls, necessitating more power, the LED will flash much more rapidly. In the case where the temperature of the heating element is far below the desired level, pulses of heating current will be continuously applied to the heating element, and the LED will flash so rapidly that it will appear to be steadily illuminated.

Figure 6:
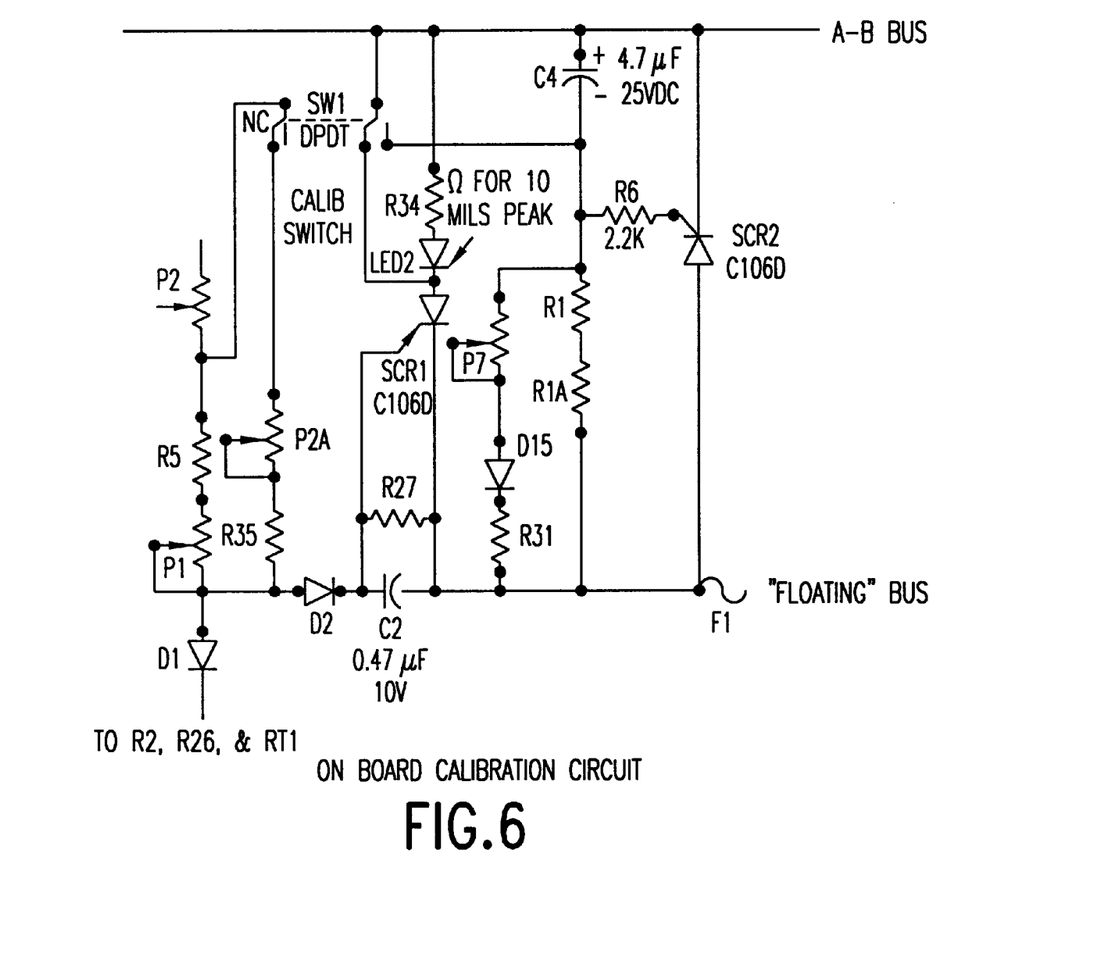
FIG. 6 provides a schematic diagram of a calibration circuit which forms part of the embodiment of FIG. 3.

FIG. 6 shows a schematic diagram of a calibration circuit used in the present invention. This circuit is also incorporated into the embodiment of FIG. 3.

The circuit of FIG. 6 allows the operator to determine exactly when the circuit will begin to provide power to the heating element, without actually applying such power. The calibration function is controlled by SW1, a double-pole double-throw switch. FIGS. 3 and 6 show SW1 in the normal mode. When it is desired to use the calibration function, SW1 is moved to the other position, i.e. to the right as shown in the figures. It can be seen from FIG. 6 that, when the switch is set to the calibration mode, capacitor C4 becomes short-circuited. The short circuit across C4 prevents the capacitor from charging, and thereby prevents SCR2 from activating. Also, when the switch is set to the calibration mode, LED2 and R34, which are short-circuited in the normal mode, become effective. The value of resistor R34 is chosen such that SCR1 cannot generate enough current to activate the triac. In particular, R34 is made large enough so that the voltage developed across R7 is well below the threshold value needed to trigger TR1, even when current flowing through SCR1 is at its peak. Thus, during the calibration mode, the triac cannot be activated, either by SCR1 or SCR2, and no power is applied to the heating element. The only current flowing through the heating element is therefore sensing current.

Since sensing current is flowing through the heating element, the bridge circuit still operates in the normal manner, and SCR1 is still activated when the bridge is unbalanced. LED2 allows one to determine, visually, when SCR1 is activated. In calibrating the control device, one adjusts the resistance of the high-resistance arm of the bridge, such as by adjusting P1 or P2, until one finds the point at which LED2 is just about to turn on or turn off. This is the correct setting for the bridge. If it is not possible to find this on-off point, then calibration is not possible, and one therefore knows, without applying heating current to the heating element, that the heating element is not appropriate for the circuit.

Calibration is usually performed at room temperature, and before the heating element has become hot. It is seen from FIGS. 6 and 3, that in the calibration mode, the resistance of the high-resistance arm of the bridge is higher, because P2A and R35 are no longer connected in parallel with R5 and P1. During the normal operating mode, the resistance of the high-resistance arm of the bridge is reduced, thereby increasing the temperature of the heating element which causes the bridge to become balanced at the bottom of its range. Potentiometer P2A is intended as a factory-set component; it is normally not intended to be changed by the user, but it could be adjusted if one needs to reconfigure the entire device. P2A serves as a general adjustment of the bridge, compensating for variations in values of the many other components.

LED2 thus serves as a display means for indicating the balanced or unbalanced condition of the bridge. Other types of display means could be substituted for LED2, within the scope of the invention.

The calibration circuit is especially useful when one seeks to change the heating element. Replacement heating elements will, in general, have different values of resistance, causing a shift in the operating temperature range of the bridge. The calibration circuit makes it easy to adjust the bridge to suit the new heating element, without applying substantial power to that element.

Figure 7A:
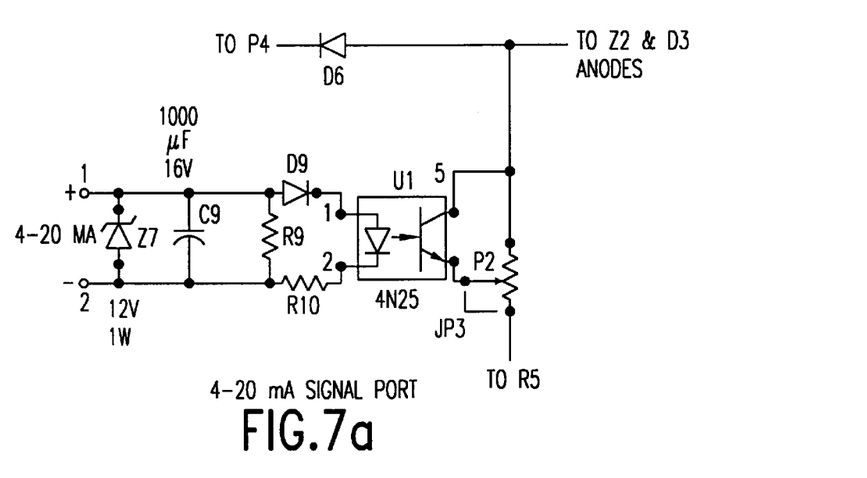
FIG. 7a provides a schematic diagram of a circuit which enables electronic adjustment of the set point of the bridge circuit, as incorporated into the embodiment of FIG. 3.

FIG. 7a shows another improvement to the circuit of the present invention. This improvement is also incorporated into the circuit of FIG. 3. The purpose of the circuit of FIG. 7a is to control the set point of the bridge remotely, simply by varying an analog current. This feature allows easy interfacing with other process control equipment, such as process control logic.

The major component of the circuit of FIG. 7a is switch U1, which is shown as an opticoupler. However, in the circuit of FIG. 7a, U1 is not operated as a switch, but instead is operated in the linear range of its transistor portion. U1 includes an internal LED which emits infrared radiation in response to current input. The transistor portion of U1 is connected in parallel with a portion of P2. A change in the amount of current flowing between the emitter and collector of the transistor changes the effective resistance of P2, as "seen" by the remainder of the bridge circuit. Thus, a change in the input current causes a change in the current flowing through the transistor, which causes a change in the effective resistance of one arm of the bridge. In this way, one can use a small input current to control the set point of the bridge. In the embodiment shown, the input current could be in the range of 4–20 mA, but the invention is not limited to any particular range.

The circuit arrangement of FIG. 7a has the further advantage that the opticoupler isolates the input current from the bridge circuit. Thus, noise on the input current line is unlikely to affect the operation of the bridge. Moreover, voltages developed by the control device are unlikely to flow back into the input current line, again due to the isolation provided by the opticoupler.

Jumper JP3 in FIG. 7a is used in the event that one wants to omit the improvement represented by FIG. 7a. Even in the absence of this circuit, one could still use P2 to adjust the high-resistance arm of the bridge.

Figure 7B:
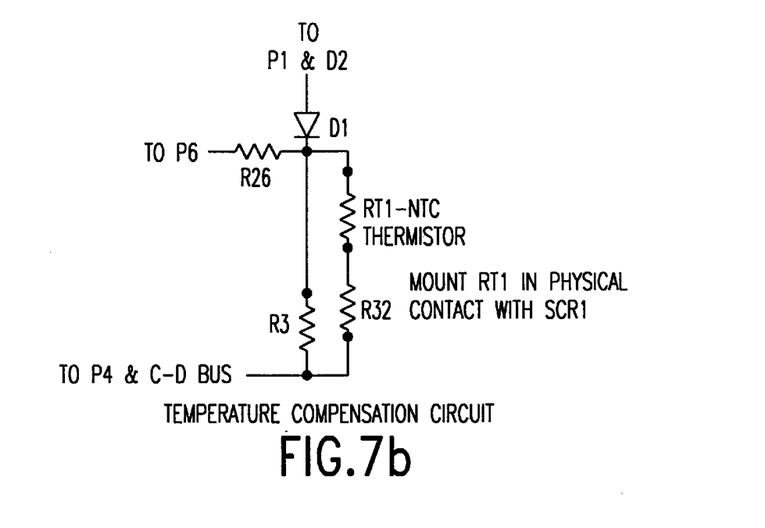
FIG. 7b provides a schematic diagram of a circuit which compensates for temperature variations in the set point of a silicon-controlled rectifier, as incorporated into the embodiment of FIG. 3.

FIG. 7b shows a temperature compensation circuit which forms another aspect of the present invention. This feature is also incorporated into FIG. 3. The circuit of FIG. 7b addresses the problem caused by the fact that the gate sensitivity of an SCR changes when it is heated. The circuit of FIG. 7b includes a thermistor RT1, connected in series with resistor R32, wherein the series combination of RT1 and R32 is connected in parallel with R3, one of the arms of the bridge. Thermistor RT1 is mounted in intimate physical contact with SCR1, so that as the temperature of SCR1 changes, the resistance of RT1 changes accordingly, and the resistance of the arm of the bridge containing R3 is modified. Thus, the set point of the bridge is varied automatically, according to changes in temperature of the SCR, such that the set point of the bridge is substantially unaffected by changes in temperature of the SCR.

Another feature of the circuit of the present invention is the position of diode D2. A comparison of FIGS. 2 and 3, with FIG. 1, shows that D2 has been relocated, in the present invention, to a position which reduces power dissipation in the lower left-hand portion of the bridge, i.e. in R3. This feature aids the temperature compensation circuit, because high power dissipation in the arm of the bridge containing R3 would also heat thermistor RT1, and the latter effect would clearly interfere with the temperature compensation function of RT1. In other words, for accurate temperature compensation, RT1 should be heated by the SCR, not by excess current flowing through the bridge.

Figure 2:
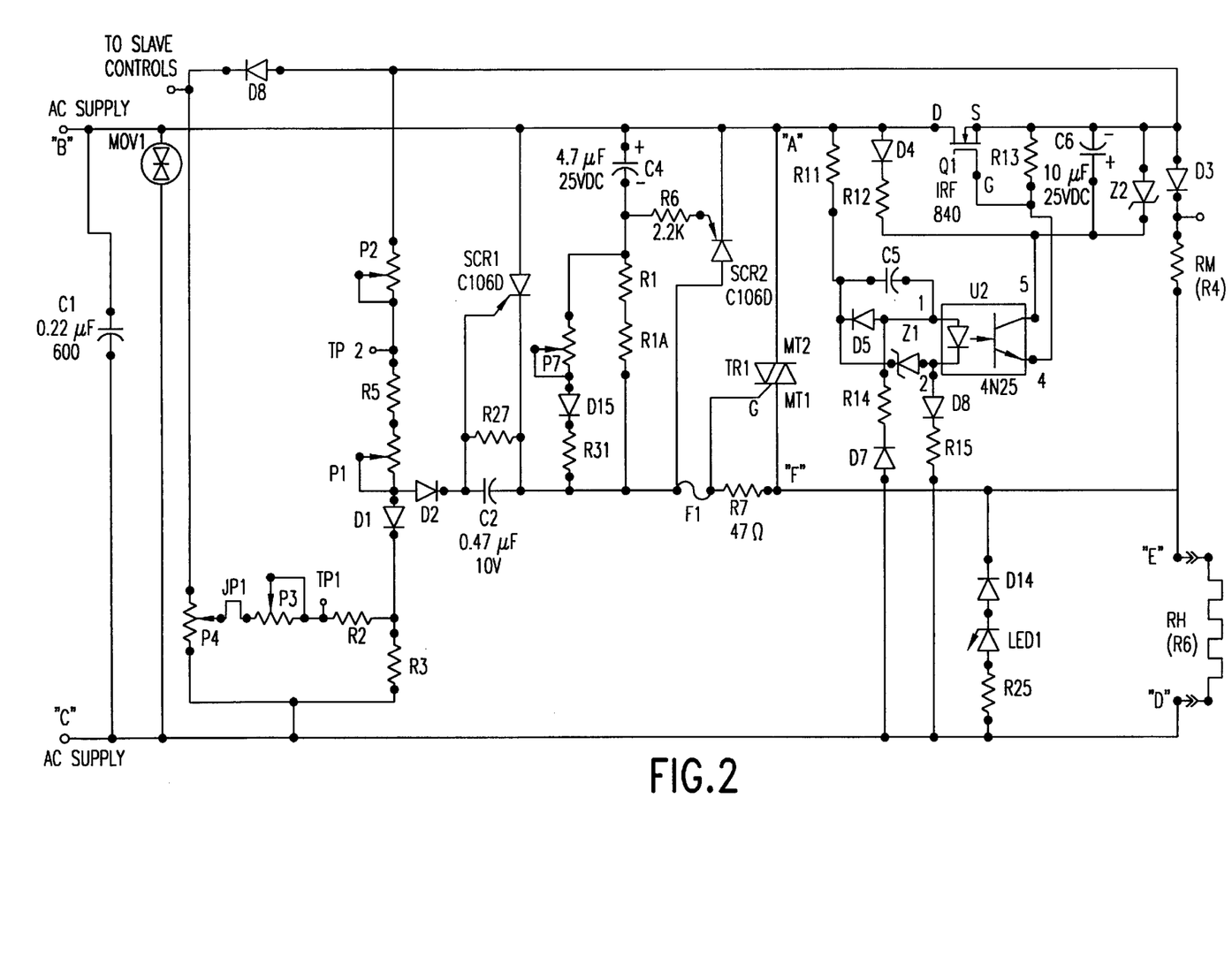
FIG. 2 provides a schematic diagram of a basic embodiment of the heating unit and temperature sensor of the present invention.

It turns out that the position of D2, shown in FIGS. 2 and 3, also improves the sensitivity of the circuit, and also reduces electrical noise.

Figure 8:
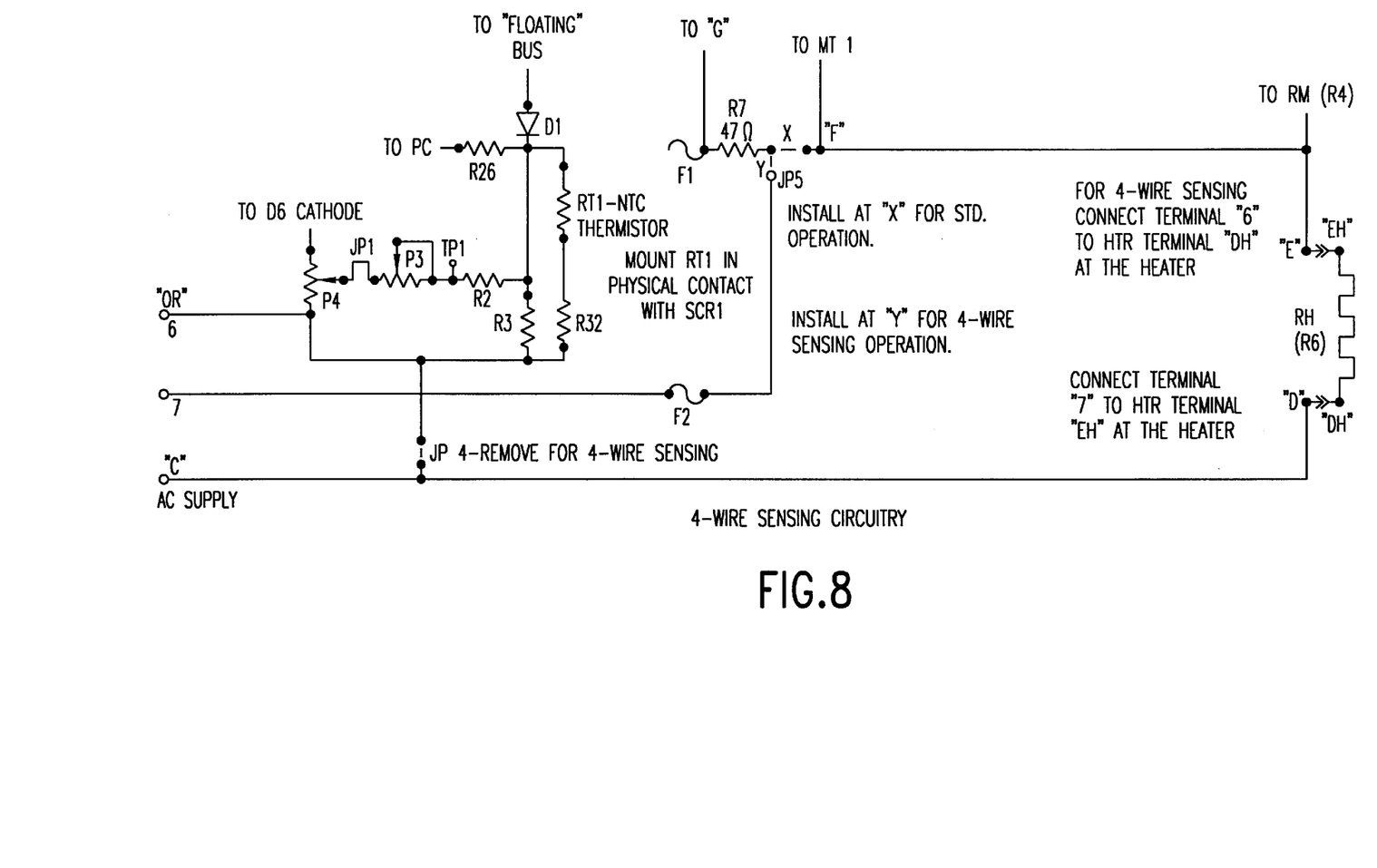
FIG. 8 provides a schematic diagram of a circuit, incorporated into the embodiment of FIG. 3, for reducing measurement errors introduced when the heating element is relatively far from the sensing circuitry.

FIG. 8 shows another improvement of the circuit of the present invention. The circuit of FIG. 8 is also incorporated into the circuit of FIG. 3. FIG. 8 addresses the problem that arises when the control circuitry is physically distant from the heating element. In this case, the use of relatively long wires is likely to introduce errors into the system because a substantial voltage drop, during the sensing period, may be developed along these wires. The present invention solves this problem by providing a pair of wires having a small diameter, the latter wires being used exclusively for measuring the sensing voltage across RH during the sensing period. Both sensing current and heating current continue to be carried by thicker wires.

In FIG. 8, terminal E is located on the control device, and terminal EH is located on the heating element. Similarly, terminal D is located on the control device, and terminal DH is located on the heating element. Although the distances between E and EH, and between D and DH, appear small on the figure, these distances, in practice, could be very great.

In normal operation, the wires leading to the heating element, shown in FIG. 8, carry both heating current and sensing current. But when separate wires are used to sense voltage (called the "remote sensing" or "four-wire sensing" arrangement), the thick wires shown in FIG. 8 transmit only sensing current and heating current. Voltage measurement is accomplished over thin wires which are not explicitly drawn in the figure, to keep the figure readable. These thin wires are indicated by verbal legends telling how the sensing wires are to be connected.

In particular, when remote sensing is used, one connects terminal 6 to terminal DH, and one connects terminal 7 to terminal EH. Both of the latter connections are made with small-diameter wires.

Also, in the remote sensing mode, jumper JP4 is removed and jumper JP5 is installed at Y. (For normal operation, jumper JP4 is maintained as shown, and jumper JP5 is installed at X.)

From FIGS. 8 and 3, it is apparent that, when the jumpers are positioned for remote sensing, and when the thin wires are connected as indicated, the sensing voltage is measured by the thin wires, but the sensing current still passes through the large-diameter wires. The heating current also passes through the large-diameter wires, as before. Note that, in the remote sensing mode, the sensing current flowing through RM can only reach the heating element RH through the large-diameter wires. The effect of this remote sensing arrangement is that the bridge will indicate a balanced or unbalanced condition based on the voltages sensed through the thin wires, and the circuit can respond by generating a heating current when required. The sensing current is still controlled by switch Q1, and therefore flows through RM and through the large-diameter wires to RH.

The invention can be modified in many ways, as will be apparent to persons skilled in the art. The circuitry shown in the figures, while representing the preferred embodiments, does not exhaust the possible ways of implementing the solutions discussed above. For example, the silicon-controlled rectifiers, opticouplers, and FETs could be replaced by other kinds or combinations of electronic switching devices, with appropriate modification of the surrounding circuitry, as will be appreciated by those skilled in the art. Although an analog arrangement of the circuit is preferred, based on present technology, some or all of the functions of the components of the circuits disclosed above could be performed digitally. The many modifications of the invention, which modifications are implied by the preferred embodiments described above, should be considered within the spirit and scope of the following claims.

What is claimed is:

1. In a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition,
the improvement wherein the control device comprises means for repeatedly interrupting a flow of the sensing current to the heating element, and wherein the interrupting means comprises means for causing sensing current to flow to the heating element starting at about a beginning of each positive half-cycle, and continuing until not more than about 60° into said positive half-cycle.

2. The improvement of claim 1, further comprising diode means for reducing power dissipation in an arm of the bridge circuit.

3. The improvement of claim 1, wherein the interrupting means is an entirely analog electronic circuit.

4. The improvement of claim 1, wherein the interrupting means comprises an electronic switch, the switch being connected to allow and block flow of sensing current, according to a condition of the switch.

5. The improvement of claim 4, wherein the electronic switch is connected to an opticoupler, wherein activation of the opticoupler causes activation of the electronic switch, and wherein the opticoupler is connected to an RC circuit which comprises means for determining a time at which the opticoupler turns on and off.

6. The improvement of claim 5, wherein the RC circuit includes a capacitor, and further comprising means for discharging the capacitor before a beginning of an electrical cycle.

7. In a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition,
the improvement wherein the means for directing a heating current includes a switch connected to the bridge circuit such that an unbalanced condition of the bridge circuit activates the switch, wherein the switch is connected for activation by a capacitor, and further comprising means for varying a time constant of an R-C network including the capacitor according to polarity of an applied voltage, wherein the time constant of said R-C network during a positive half-cycle is different from the time constant during a negative half-cycle, wherein the varying means comprises means for preventing unintended activation of the switch by the capacitor.

8. The improvement of claim 7, wherein the time constant varying means comprises a network of resistors connected in parallel, the network being connected in series with the capacitor, wherein the network includes a branch having a diode.

9. The improvement of claim 8, wherein the branch having the diode also includes a variable resistor.

10. In a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition,
the improvement comprising means for remotely controlling a set point of the bridge circuit by application of a control current, the remote controlling means comprising means for electronically varying an effective resistance of one arm of the bridge circuit in response to said control current.

11. The improvement of claim 10, wherein one arm of the bridge includes a variable resistor, wherein the means for electronically varying an effective resistance comprises a transistor having an output connected to said variable resistor, wherein the control current comprises an input to the transistor, wherein the output of the transistor varies an effective resistance of said variable resistor.

12. The improvement of claim 11, wherein the control current is coupled to the transistor through an opticoupler.

13. In a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, the improvement wherein the means for directing a heating current includes a switch connected to the bridge circuit such that an unbalanced condition of the bridge circuit activates the switch, and further comprising a thermistor connected to an arm of the bridge circuit, the thermistor also being in sufficient physical contact with the switch such that heat from the switch affects a resistance value of the thermistor, wherein the thermistor and the switch together comprise means for compensating for temperature-induced variations in gate sensitivity of the switch.

14. The improvement of claim 13, further comprising diode means for reducing power dissipation in said arm of the bridge circuit.

15. The improvement of claim 13, wherein the thermistor is connected in series with a fixed resistor, and wherein a combination of the thermistor and the fixed resistor is connected in parallel with an arm of the bridge circuit.

16. A method of operating a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, the method comprising the step of repeatedly interrupting a flow of the sensing current to the heating element, such that the sensing current flows through the heating element starting at about a beginning of each positive half-cycle, and continuing until not more than about 60° into said positive half-cycle.

17. A method of operating a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, wherein the means for directing a heating current includes a switch connected to the bridge circuit such that an unbalanced condition of the bridge circuit activates the switch, wherein the switch is connected for activation by a capacitor, wherein the method comprises the step of varying a time constant of an R-C network including the capacitor according to polarity of an applied voltage, such that the time constant of said R-C network during a positive half-cycle is different from the time constant during a negative half-cycle, wherein the circuit prevents unintended activation of the switch by the capacitor.

18. A method of operating a control device including a combined temperature sensor and heating unit, the control device comprising a bridge circuit having a plurality of arms, one arm of the bridge circuit comprising a heating element, means for directing a sensing current and means for directing a heating current through the heating element, the method comprising the step of calibrating the control device by disabling the heating current directing means while leaving unaffected the sensing current directing means, and varying a resistance in at least one arm of the bridge circuit while observing a display means connected across an arm of the bridge, until current begins to flow through the display means.

19. A method of operating a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, the method comprising the step of remotely controlling a set point of the bridge circuit by electronically varying an effective resistance of one arm of the bridge circuit in response to a control current.

20. A method of operating a control device including a combined temperature sensor and heating unit, the control device comprising a bridge circuit having a plurality of arms, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, wherein the means for directing a heating current includes a switch connected to the bridge circuit such that an unbalanced condition of the bridge circuit activates the switch, the method comprising the step of automatically adjusting resistance of an arm of the bridge circuit so as to compensate for changes in gate sensitivity in the switch caused by heat generated by the switch.

21. A calibration circuit for a control device which includes a combined temperature sensor and heating unit, the control device comprising:
(a) a bridge circuit having a plurality of arms, one arm of the bridge circuit comprising a heating element,
(b) means for directing a sensing current through the heating element,
(c) means for directing a heating current through the heating element, the heating current directing means including first and second control switches and a power switch, the first and second control switches being connected across an arm of the bridge circuit, and being connected to the power switch so as to activate the power switch and to supply heating current to the heating element, wherein the calibration circuit comprises:
(d) a resistor and a current indicator connected in series with the first control switch,
(e) means for configuring the calibration circuit in a calibration mode or a normal mode, the configuring means comprising means for disabling the second control switch only in the calibration mode, and means for disabling the series combination only in the normal mode, wherein, in the calibration mode, a series combination comprising the resistor, the current indicator, and the first control switch is connected across an arm of the bridge, and (f) a variable resistor connected to one of the arms of the bridge so as to vary a resistance of said one of the arms, wherein the calibration circuit comprises means for calibrating the bridge while sensing current is flowing through the bridge.

22. The calibration circuit of claim 21, wherein the current indicator comprises a light-emitting diode.

23. The calibration circuit of claim 22, wherein the configuring means includes a mechanical switch which both connects the series combination and short-circuits a capacitor, connected to the second control switch, in the calibration mode, and short-circuits the series combination and enables the capacitor in the normal mode.

24. In a control device including a combined temperature sensor and heating unit, the control device comprising a bridge circuit having a plurality of arms and a plurality of nodes, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, wherein the heating element has two ends, and wherein the heating element is connected to the bridge through a first pair of wires connected to said two ends, and wherein said first pair of wires have electrical resistance, the improvement wherein the circuit includes a second pair of wires connected directly across the heating element, and means for configuring the circuit such that the ends of the heating element comprise nodes of the bridge, wherein the configuring means comprises means for grouping the resistance of said first pair of wires with arms of the bridge other than the heating element, wherein said second pair of wires comprise means for sensing a voltage across the heating element without carrying appreciable current.

25. A method of operating a control device including a combined temperature sensor and heating unit, the control device comprising a bridge circuit having a plurality of arms and a plurality of nodes, one arm of the bridge circuit comprising a heating element, means for directing a sensing current through the heating element, means for detecting a condition wherein the bridge circuit is in an electrically balanced state, and means for directing a heating current through the heating element in response to an electrically unbalanced condition, wherein the heating element has two ends, and wherein the heating element is connected to the bridge through a first pair of wires connected to said two ends, and wherein said first pair of wires have electrical resistance, the method comprising the step of connecting a second pair of wires directly across the heating element, and configuring the circuit such that the ends of the heating element comprise nodes of the bridge, such that the resistance of said first pair of wires comprises part of arms of the bridge other than the heating element, and using the second pair of wires to sense a voltage across the heating element without carrying appreciable current in said second pair of wires.

* * * * *